(12) United States Patent
Yu

(10) Patent No.: US 8,682,532 B2
(45) Date of Patent: Mar. 25, 2014

(54) VEHICLE INCLUDING FRICTION CONTROL DEVICE AND METHODS

(75) Inventor: Jinghong Yu, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 418 days.

(21) Appl. No.: 13/188,618

(22) Filed: Jul. 22, 2011

(65) Prior Publication Data

US 2013/0024070 A1    Jan. 24, 2013

(51) Int. Cl.
*G06F 19/00* (2011.01)
(52) U.S. Cl.
USPC .............................. 701/41; 180/446
(58) Field of Classification Search
USPC .......... 701/36, 37, 41, 42; 180/404, 441, 443, 180/444, 446
See application file for complete search history.

(56) References Cited

U.S. PATENT DOCUMENTS

| | | |
|---|---|---|
| 4,070,121 A | 1/1978 | Graham |
| 4,159,186 A | 6/1979 | Funcke |
| 4,468,739 A | 8/1984 | Woods et al. |
| 4,537,524 A | 8/1985 | Hanson |
| 4,709,593 A | 12/1987 | Takeuchi |
| 5,052,844 A | 10/1991 | Kendall |
| 5,253,728 A | 10/1993 | Matsuno et al. |
| 5,265,691 A | 11/1993 | Konishi et al. |
| 5,346,241 A | 9/1994 | Lee |
| 5,388,658 A | 2/1995 | Ando et al. |
| 5,415,426 A | 5/1995 | Strasser |
| 5,431,429 A | 7/1995 | Lee |
| 5,435,591 A | 7/1995 | Lee |
| 5,560,590 A | 10/1996 | Reast |
| 5,620,390 A * | 4/1997 | Kono et al. ..................... 477/65 |
| 5,704,727 A | 1/1998 | Atkins et al. |
| 5,721,681 A | 2/1998 | Borschert et al. |
| 5,816,731 A | 10/1998 | Howard |
| 6,032,755 A | 3/2000 | Blandino et al. |
| 6,077,302 A | 6/2000 | Kumra et al. |
| 6,145,400 A | 11/2000 | Garza |
| 6,154,696 A | 11/2000 | Nishi et al. |
| 6,164,860 A | 12/2000 | Kondo |
| 6,412,591 B1 | 7/2002 | Endo et al. |
| 6,530,625 B2 | 3/2003 | Arnold et al. |
| 6,533,490 B2 | 3/2003 | Kincaid et al. |
| 6,597,975 B1 | 7/2003 | Shinmura et al. |
| 6,701,236 B2 | 3/2004 | Ulyanov et al. |
| 6,726,229 B2 | 4/2004 | Smith et al. |
| 6,945,541 B2 | 9/2005 | Brown |
| 7,048,461 B2 | 5/2006 | Williams |
| 7,076,351 B2 | 7/2006 | Hamilton et al. |
| 7,089,104 B2 | 8/2006 | Post, II et al. |

(Continued)

FOREIGN PATENT DOCUMENTS

| | | |
|---|---|---|
| JP | 60053465 A | 3/1985 |
| JP | 2002161969 A | 6/2002 |

(Continued)

*Primary Examiner* — Richard Camby
(74) *Attorney, Agent, or Firm* — Ulmer & Berne LLP

(57) ABSTRACT

A method for controlling a vehicle comprises operating at least one friction control device in a first friction mode, said at least one friction control device comprising one of a suspension damper, a lower control arm ball joint, a strut bearing, a steering rack guide, and an outer tie rod ball joint. The method further comprises changing operation of said at least one friction control device from the first friction mode to a second friction mode.

9 Claims, 8 Drawing Sheets

(56) References Cited

U.S. PATENT DOCUMENTS

| | | |
|---|---|---|
| 7,096,170 B2 | 8/2006 | Fujita |
| 7,110,926 B2 | 9/2006 | Nishizawa et al. |
| 7,185,902 B1 | 3/2007 | Lloyd |
| 7,272,478 B2 | 9/2007 | Tamai |
| 7,299,120 B2 | 11/2007 | Serebrennikov |
| 7,464,906 B2 | 12/2008 | Temperato et al. |
| 7,476,050 B2 | 1/2009 | Ditzler |
| 7,537,407 B2 | 5/2009 | Shima |
| 2002/0138186 A1 | 9/2002 | Kim |
| 2005/0049761 A1 | 3/2005 | Kataoka et al. |
| 2008/0034910 A1 | 2/2008 | Roline et al. |
| 2008/0249690 A1 | 10/2008 | Matsumoto et al. |
| 2008/0281491 A1 | 11/2008 | Yasui et al. |
| 2009/0024277 A1 | 1/2009 | Poilbout |
| 2009/0103974 A1 | 4/2009 | Dendis et al. |
| 2009/0254249 A1 | 10/2009 | Ghoneim et al. |
| 2009/0266658 A1 | 10/2009 | Lueker, Jr. |
| 2009/0287377 A1 | 11/2009 | Nakamura et al. |
| 2010/0250081 A1 | 9/2010 | Kinser et al. |

FOREIGN PATENT DOCUMENTS

| | | |
|---|---|---|
| JP | 2005067455 A | 3/2005 |
| JP | 2005104416 A | 4/2005 |
| JP | 2005170116 A | 6/2005 |
| JP | 2007083940 A | 5/2007 |

* cited by examiner

| FRICTION OF DEVICE / VEHICLE PERFORMANCE AREA | FRICTION TORQUE OF STRUT BEARING | FRICTION FORCE OF SUSPENSION DAMPER | FRICTION TORQUE OF SUSPENSION DAMPER | FRICTION TORQUE OF LOWER CONTROL ARM BALL JOINT | FRICTION TORQUE OF OUTER TIE ROD BALL JOINT | FRICTION FORCE OF STEERING RACK GUIDE |
|---|---|---|---|---|---|---|
| STEERING FEEL AT HIGH SPEED | △ | × | × | △ | ○ | ◎ |
| TORQUE STEER | ○ | × | × | ◎ | ◎ | ◎ |
| DRIFT | ◎ | × | × | ◎ | ○ | ○ |
| STEERING FEEL AT LOW SPEED | △ | ○ | × | ○ | ◎ | ◎ |
| BODY ROLL MOTION | ◎ | × | × | ○ | ○ | ◎ |
| BRAKE JUDDER | ◎ | × | × | ○ | ○ | ◎ |
| VERTICAL MOTION | × | ◎ | × | ○ | ○ | × |

◎ MOST INFLUENTIAL   △ PARTIALLY INFLUENTIAL
○ INFLUENTIAL        × NOT INFLUENTIAL

*FIG. 11*

VEHICLE INCLUDING FRICTION CONTROL DEVICE AND METHODS

TECHNICAL FIELD

A vehicle includes a friction control device having a variable friction force and/or a variable friction torque.

BACKGROUND

A wheeled vehicle includes a suspension system for coupling wheels to a vehicle.

SUMMARY

In accordance with one embodiment, a method for controlling a vehicle comprises operating at least one friction control device in a first friction mode. Said at least one friction control device comprises one of a suspension damper, a lower control arm ball joint, a strut bearing, a steering rack guide, and an outer tie rod ball joint. The method further comprises detecting a vehicular speed and detecting a vehicular deceleration rate. The method still further comprises changing operation of said at least one friction control device from the first friction mode to a second friction mode in response to both the vehicular speed exceeding a threshold brake judder speed value and the vehicular deceleration rate exceeding a threshold brake judder deceleration value.

In accordance with another embodiment, a method for controlling a vehicle comprises operating at least one friction control device in a first friction mode. Said at least one friction control device comprises one of a suspension damper, a lower control arm ball joint, a strut bearing, a steering rack guide, and an outer tie rod ball joint. The method further comprises detecting a velocity of a throttle device, detecting an operating gear of a transmission, detecting a vehicular speed, and detecting operation of a brake system. The method still further comprises changing operation of said at least one friction control device from the first friction mode to a second friction mode in response to the velocity of the throttle device, the operating gear of the transmission, the vehicular speed, and operation of the brake system.

In accordance with yet another embodiment, a method for controlling a vehicle comprises operating at least one friction control device in a first friction mode. Said at least one friction control device comprises one of a suspension damper, a lower control arm ball joint, a strut bearing, a steering rack guide, and an outer tie rod ball joint. The method further comprises detecting a vehicular speed and detecting a vertical acceleration rate. The method still further comprises changing operation of said at least one friction control device from the first friction mode to a second friction mode in response to both the vehicular speed exceeding a threshold vehicular speed value and the vertical acceleration rate exceeding a threshold vertical acceleration value.

In accordance with yet another embodiment, a method for controlling a vehicle comprises operating at least one friction control device in a first friction mode. Said at least one friction control device comprises one of a suspension damper, a lower control arm ball joint, a strut bearing, a steering rack guide, and an outer tie rod ball joint. The method further comprise detecting a vehicular speed and changing operation of said at least one friction control device from the first friction mode to a second friction mode and a third friction mode in response to the vehicular speed exceeding a first threshold speed value and a second threshold speed value, respectively.

BRIEF DESCRIPTION OF THE DRAWINGS

Various embodiments will become better understood with regard to the following description, appended claims and accompanying drawings wherein:

FIG. 11 is a table depicting how certain friction forces and friction torques affect a variety of vehicle performances, according to one embodiment.

DETAILED DESCRIPTION

Figure 1:
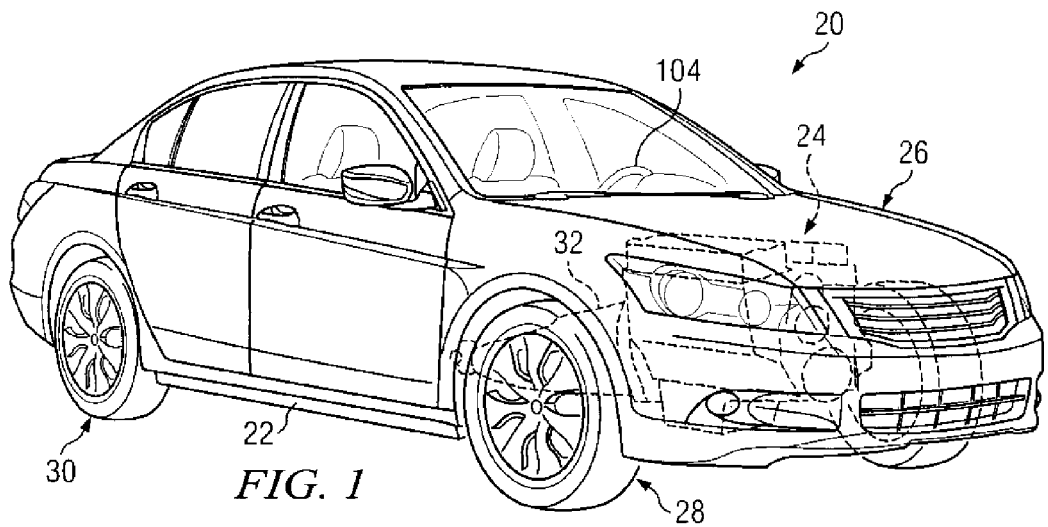
FIG. 1 is a right front perspective view depicting a vehicle that includes a suspension system, in accordance with one embodiment.

Embodiments are hereinafter described in detail in connection with the views of FIGS. 1-11, wherein like numbers indicate the same or corresponding elements throughout the views. A vehicle 20 in accordance with one embodiment can comprise an automobile, as illustrated in FIG. 1, or any of a variety of other suitable vehicles, such as a recreational vehicle or a utility vehicle, for example. In one embodiment, and as depicted in FIG. 1, a vehicle 20 can include a frame 22 and an engine 24. The engine 24 can be provided within an engine compartment 26. Front wheels (e.g., 28) and rear wheels (e.g., 30) can be rotatably coupled with the frame 22. The vehicle 20 can comprise a transmission 32 that couples the engine 24 with one or more of the wheels (e.g., 28, 30) of the vehicle. The transmission 32 can be coupled to the engine 24 such that power from the engine 24 can be transmitted through the transmission 32, to a drivetrain (not shown), and to the wheels (e.g., 28, 30) to propel the vehicle 20. The transmission 32 can be operable in one of a plurality of gears to facilitate operation of the vehicle 20 at different speeds.

The vehicle 20 can comprise an accelerator pedal 34 (FIG. 4) that is movable (e.g., with an operator's foot) to facilitate operation of the vehicle 20 at different speeds. In other embodiments, the vehicle 20 can include a hand-operated throttle or any of a variety of other suitable throttle devices that are movable to facilitate selective acceleration of the vehicle 20.

Figure 2:
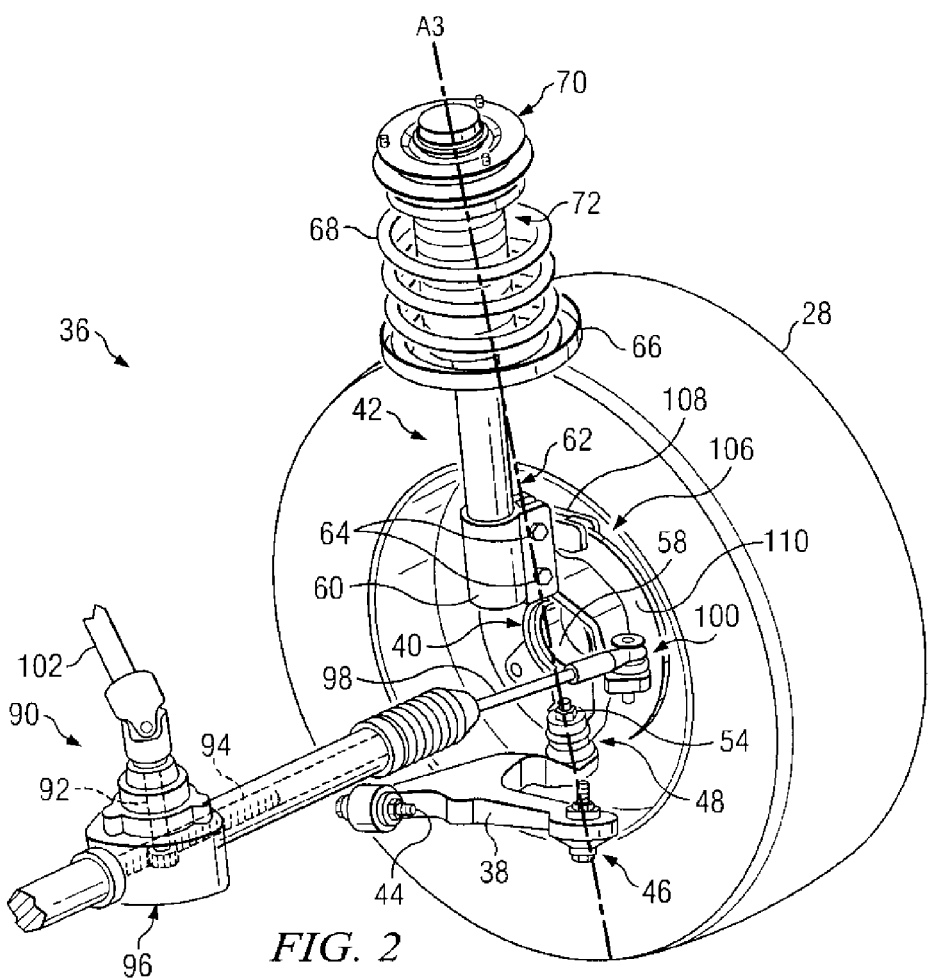
FIG. 2 is a right front perspective view depicting a portion of the suspension system of FIG. 1, wherein certain associated components of the vehicle have been removed for clarity of illustration.

As illustrated in FIG. 2, the vehicle 20 can include a suspension system 36 having a support arm 38, a wheel knuckle 40, and a suspension damper 42 that can cooperate to rotatably support one of the front wheels 28 with respect to the frame 22. The support arm 38 is shown to include a bolt 44 and a frame ball joint 46 or bushing that can facilitate pivotal coupling of the support arm 38 to the frame 22. It will be appreciated, however, that a support arm can be configured in any of a variety of suitable alternative arrangements that facilitate its pivotal coupling with a frame of a vehicle.

Figure 3:
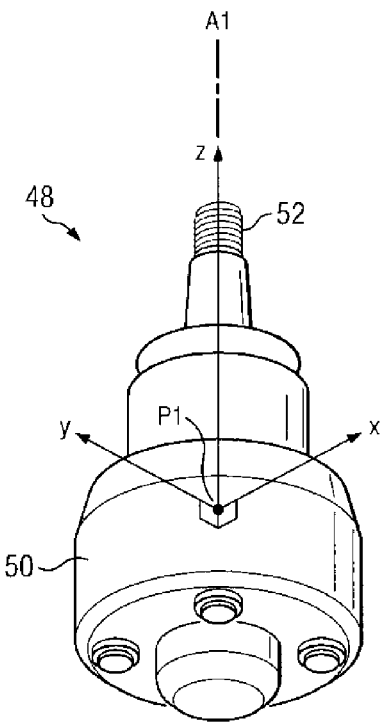
FIG. 3 is a right front perspective view depicting a lower control arm ball joint of the suspension system of FIG. 2, apart from other components of the suspension system.

As illustrated in FIG. 2, the wheel knuckle 40 can be coupled with the support arm 38 by a lower control arm ball joint 48. In one embodiment, as illustrated in FIG. 3, the lower control arm ball joint 48 can comprise a socket base 50 and a ball stem 52. The ball stem 52 can be engaged with the socket base 50 in a spheroid-type arrangement such that the ball stem 52 is pivotable with respect to the socket base 50 about a point P1 (e.g., about axes x, y, and z) and is rotatable about an axis A1 that can extend along the ball stem 52, as illustrated in FIG. 3. The socket base 50 can be coupled with the support arm 38 and the ball stem 52 can be coupled with the wheel knuckle 40. In one embodiment, the socket base 50 can be coupled with the support arm 38 in a press-fit arrangement or with a circlip, and the ball stem 52 can comprise a threaded stem that is coupled to the wheel knuckle 40 with a nut (e.g., 54). However, it will be appreciated that a lower control arm ball joint can be coupled with a support arm and a wheel knuckle in any of a variety of suitable alternative arrangements.

In one embodiment, the lower control arm ball joint 48 can comprise a friction control device that is configured such that a friction force (e.g., coefficient of friction) between the socket base 50 and the ball stem 52 can be varied to change the freedom of movement between the socket base 50 and the ball stem 52. In such an embodiment, the lower control arm ball joint 48 can vary in operation between a nominal friction mode and an increased friction mode. As the lower control arm ball joint 48 changes operation from the nominal friction mode to the increased friction mode, the coefficient of friction between the socket base 50 and the ball stem 52 can increase which can make movement of the ball stem 52 with respect to the socket base 50 increasingly difficult.

Figure 4:
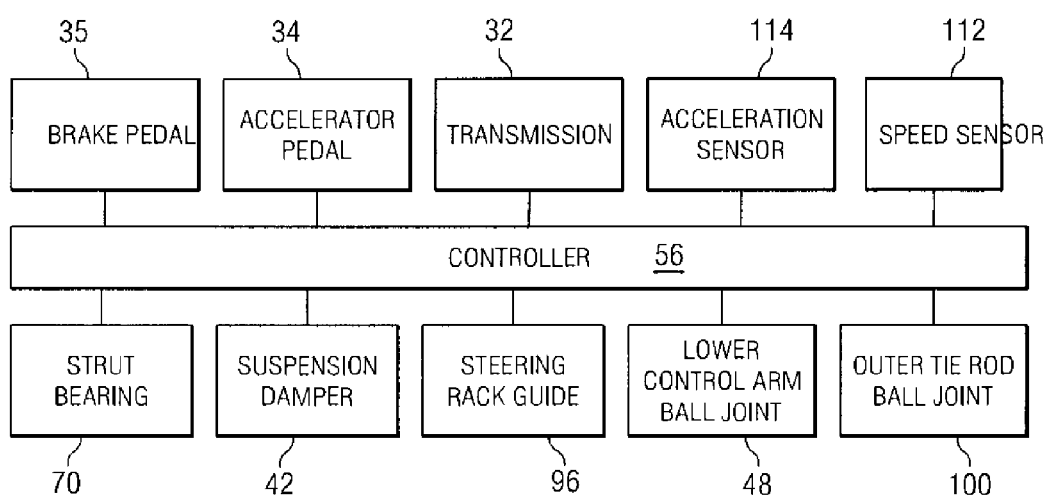
FIG. 4 is a block diagram of a controller and certain other components of the vehicle of FIG. 1.

The lower control arm ball joint 48 can be coupled with a controller 56, as illustrated in FIG. 4, which can facilitate operation of the lower control arm ball joint 48 between the nominal friction mode and the increased friction mode. The controller 56 can comprise an engine control unit (ECU), a power train control module (PCM), an engine control module (ECM) or any of a variety of other suitable alternative vehicular controllers.

In one embodiment, the lower control arm ball joint 48 can comprise a smart fluid-type ball joint. In such an embodiment, a controllable smart fluid (e.g., magneto-rheological fluid or electro-rheological fluid) can be provided as the interface between the socket base 50 and the ball stem 52. The controller 56 can facilitate application of a variable field charge (e.g., an electric field and/or magnetic field) to the smart fluid to operate the lower control arm ball joint 48 between the nominal friction mode and the increased friction mode. In one example, by increasing the variable field charge, the friction force between the socket base 50 and the ball stem 52 can be increased such that the lower control arm ball joint 48 changes operation from the nominal friction mode to the increased friction mode.

In another embodiment, the lower control arm ball joint 48 can comprise a motor-type variable friction ball joint. In such an embodiment, the socket base 50 can be equipped with a linear motor that actuates a friction seat associated with the ball stem 52 to vary the friction force between the socket base 50 and the ball stem 52. U.S. patent application Ser. No. 12/607,095, filed Oct. 28, 2009, which is hereby incorporated herein by reference in its entirety, discloses an example of a suitable type motor-type variable friction ball joint.

Referring again to FIG. 2, the wheel knuckle 40 can define a bearing hub 58. A bearing (not shown) can be supported within the bearing hub 58 (e.g., in a press fit arrangement) to facilitate rotatable support of an axle shaft (not shown) with respect to the wheel knuckle 40. A wheel hub (not shown) can be coupled with the axle shaft (e.g., in a splined arrangement) and can support one of the front wheels 28 with lugs (not shown).

The wheel knuckle 40 can be coupled with the suspension damper 42. As illustrated in FIG. 2, the wheel knuckle 40 can include a suspension bracket 60 that is provided in a split clamp-type arrangement. A lower end 62 of the suspension damper 42 can be inserted into the suspension bracket 60 and releasably coupled with bolts 64. The suspension damper 42 can include a spring flange 66 that provides underlying support for a spring 68. A strut bearing 70 can overlie the spring 68 and can interface with an upper end 72 of the suspension damper 42. The strut bearing 70 can include threaded stems 74 (FIG. 5) that facilitate coupling of the upper end 72 of the suspension damper 42 with a portion of the frame 22 that resides above the front wheels 28 (e.g., above a wheel well).

Figure 5:
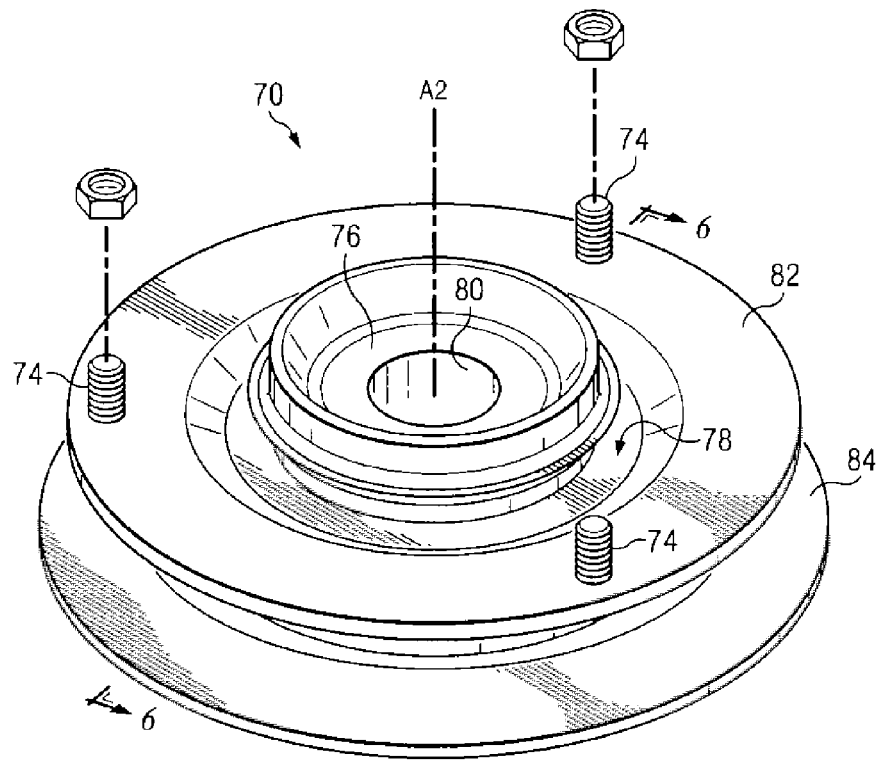
FIG. 5 is a perspective view depicting a strut bearing of the suspension system of FIG. 2, apart from other components of the suspension system.

In one embodiment, as illustrated in FIG. 5, the strut bearing 70 can include an inner race 76 and an outer race 78. The inner race 76 can be formed from an elastomeric material (e.g., rubber) and can define a passageway 80 that is configured to receive the upper end 72 of the suspension damper 42. The outer race 78 can define a bolt flange 82 that supports the threaded stems 74. The inner race 76 can be journalled with respect to the outer race 78 such that the inner race 76 is rotatable with respect to the outer race 78 about an axis A2. The strut bearing 70 can also include a spring plate 84 that is configured to contact the spring 68 when the strut bearing 70 interferences the upper end 72 of the suspension damper 42, as shown in FIG. 2.

The ability of the inner race 76 to rotate with respect to the outer race 78 can be affected by a friction force (e.g., coefficient of friction) between the inner race 76 and the outer race 78. The greater the friction force between the inner race 76 and the outer race 78, the more difficult it can be to rotate the inner race 76 with respect to the outer race 78. In one embodiment, the strut bearing 70 can comprise a friction control device that is configured such that the friction force between the inner race 76 and the outer race 78 can be varied to change the freedom of movement between the inner race 76 and the outer race 78. In such an embodiment, the strut bearing 70 can be operable between a nominal friction mode and an increased friction mode. As the strut bearing 70 changes in operation from the nominal friction mode to the increased friction mode, the friction force between the inner race 76 and the outer race 78 can increase which can make movement of the inner race 76 with respect to the outer race 78 increasingly difficult. The strut bearing 70 can be coupled with the controller 56, as illustrated in FIG. 4, which can facilitate variation in operation of the strut bearing 70 between the nominal friction mode and the increased friction mode.

Figure 6:
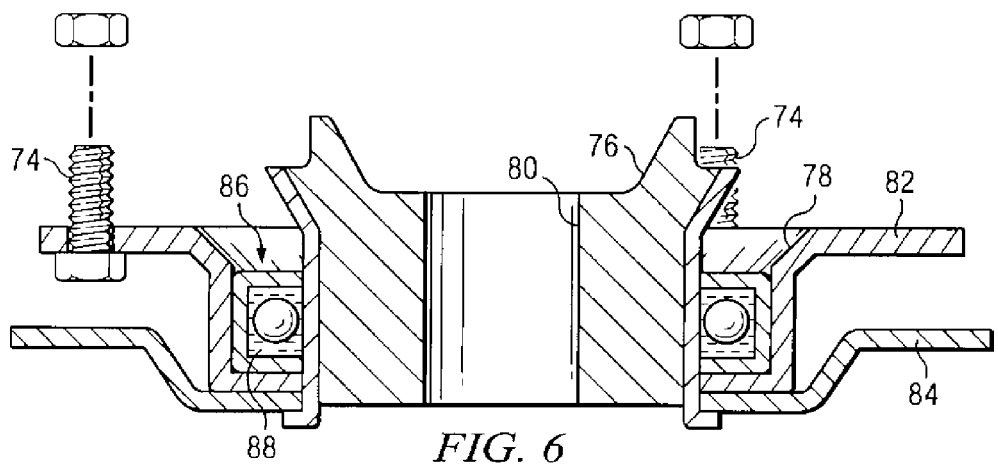
FIG. 6 is a cross-sectional view depicting the strut bearing of FIG. 5 taken along lines 6-6 in FIG. 5.

In one embodiment, the strut bearing 70 can comprise a smart fluid-type strut bearing. In such an embodiment, as illustrated in FIG. 6, the inner race 76 and the outer race 78 can be journalled with respect to each other by an annular bearing 86 that includes smart fluid 88 (e.g., magneto-rheological fluid or electro-rheological fluid). The controller 56 can facilitate application of a variable field charge (e.g., an electric field and/or magnetic field) to the smart fluid 88 such that operation of the strut bearing 70 varies between the nominal friction mode and the increased friction mode. In one example, by increasing the variable field charge, the friction force between the inner race 76 and the outer race 78 can increase to change operation of the strut bearing 70 from the nominal friction mode to the increased friction mode.

The lower control arm ball joint 48 and the strut bearing 70 can cooperate to facilitate pivoting of the wheel knuckle 40 about the king pin axis A3, as shown in FIG. 2. During operation of the vehicle 20, the support arm 38 can pivot with respect to the frame 22 to accommodate vertical movement of the front wheel 28. The suspension damper 42 can dampen the shock impulses imparted to the support arm 38 that might otherwise affect the overall comfort of the vehicle 20. It will be appreciated that a support arm and/or wheel knuckle can be provided in any of a variety of suitable alternative arrangements that facilitate rotatable support of a wheel with respect to a frame. For example, a vehicle can include an upper support arm and a lower support arm which can each be pivotably coupled with a frame of a vehicle (e.g., with bolts). Each of the upper and lower support arms can be coupled to the wheel knuckle with ball joints.

In one embodiment, the suspension damper 42 can comprise a friction control device that is configured such that a friction force and/or friction torque of the suspension damper 42 can be varied to change the freedom of movement (e.g., rotation and compression) of the lower and upper ends 62, 72 with respect to each other. In such an embodiment, the suspension damper 42 can be operable between a nominal friction mode and an increased friction mode. As the suspension damper 42 operates from the nominal friction mode to the increased friction mode, the friction force and/or friction torque can increase which can make movement of the lower and upper ends 62, 72 with respect to each other increasingly difficult. It will be appreciated that the suspension damper 42 can comprise any of a variety of suitable alternative cushion arrangements, such as an electromagnetic shock absorber, electrorheological shock absorber, or a fluid-type (e.g., pneumatic or hydraulic) shock absorber, for example. As illustrated in FIG. 4, the suspension damper 42 can be coupled with the controller 56 which can facilitate variation in operation of the suspension damper 42 between the nominal friction mode and the increased friction mode.

Referring again to FIG. 2, the vehicle 20 can include a steering assembly 90 that facilitates steering of the vehicle 20. In one embodiment, as illustrated in FIG. 2, the steering assembly 90 can include a rack and pinion steering arrangement having a pinion shaft 92, a rack 94, and a steering rack guide 96. The pinion shaft 92 and the rack 94 can be coupled together with intermeshing gear surfaces (not shown) located at the steering rack guide 96. A tie rod 98 can extend from the rack 94 and can be coupled with the wheel knuckle 40 by an outer tie rod ball joint 100.

A steering shaft 102 can operably couple a steering wheel (104 in FIG. 1) and the pinion shaft 92 together. Operation of the steering wheel 104 (e.g., to steer the vehicle 20) can move the tie rod 98 to pivot the wheel knuckle 40 leftwardly and rightwardly about the king pin axis A3. The outer tie rod ball joint 100 can facilitate pivoting of the wheel knuckle 40 with respect to the tie rod 98 during steering of the vehicle 20. The outer tie rod ball joint 100 can be similar in many respects to the lower control arm ball joint 48. For example, in one embodiment, a socket base (e.g., 50) of the outer tie rod ball joint 100 can be coupled with the tie rod 98 and a ball stem (e.g., 52) of the outer tie rod ball joint 100 can be coupled with the wheel knuckle 40. In one embodiment, the outer tie rod ball joint 100 can comprise a friction control device that is similar in many respects to the lower control arm ball joint 48 as a friction control device as described above. As illustrated in FIG. 4, the outer tie rod ball joint 100 can be coupled with the controller 56 which can facilitate variation in operation of the outer tie rod ball joint 100 between the nominal friction mode and the increased friction mode.

It will be appreciated that the ability of the pinion shaft 92 to rotate and operate the rack 94 can be affected by a friction force (e.g., a coefficient of friction) between the pinion shaft 92 and the steering rack guide 96 and a friction force (e.g., a coefficient of friction) between the rack 94 and the steering rack guide 96. The greater the friction forces between the pinion shaft 92 and the steering rack guide 96 and between the rack 94 and the steering rack guide 96, the more difficult it can be to rotate the pinion shaft 92 with respect to the steering rack guide 96 (e.g., to steer the vehicle 20). In one embodiment, the steering rack guide 96 can comprise a friction control device that is configured such that the friction forces between the pinion shaft 92 and the steering rack guide 96 and between the rack 94 and the steering rack guide 96 can be varied to change the freedom of movement between the pinion shaft 92 and the steering rack guide 96. In such an embodiment, the steering rack guide 96 can vary in operation between a nominal friction mode and an increased friction mode. As the steering rack guide 96 changes operation from the nominal friction mode to the increased friction mode, the friction forces between the pinion shaft 92 and the steering rack guide 96 and between the rack 94 and the steering rack guide 96 can increase which can make movement of the pinion shaft 92 with respect to the steering rack guide 96 increasingly difficult. In one embodiment, the steering rack guide 96 can include a linear motor that facilitates a change in the friction forces between the pinion shaft 92 and the steering rack guide 96 and between the rack 94 and the steering rack guide 96, such as disclosed in U.S. patent application Ser. No. 12/814,593, filed Jun. 14, 2010, which is hereby incorporated herein by reference in its entirety. In an alternative embodiment, the steering rack guide 96 can include smart fluid that can react to a variable field charge to change the friction forces between the pinion shaft 92 and the steering rack guide 96 and between the rack 94 and the steering rack guide 96. As illustrated in FIG. 4, the steering rack guide 96 can be coupled with the controller 56 which can facilitate variation in operation of the steering rack guide 96 between the nominal friction mode and the increased friction mode.

As illustrated in FIG. 4, the controller 56 can be coupled with a speed sensor 112 and an acceleration sensor 114 to facilitate detection of the speed and acceleration of the vehicle 20, respectively. In some embodiments, the speed sensor 112 can comprise a speedometer sensor, wheel speed sensor(s) located on one or more of the wheels (e.g., as part of an antilock brake system), and/or any of a variety of other suitable speed sensor arrangements such as, for example, sensors associated with a transmission, a transfer assembly, or an engine, which can indirectly obtain speed data. In one embodiment, the acceleration sensor 114 can comprise an accelerometer that is configured to detect longitudinal, vertical, and horizontal acceleration/deceleration of the vehicle 20. In other embodiments, an acceleration sensor can comprise any of a variety of arrangements that facilitate detection of vehicular longitudinal, vertical, and/or horizontal acceleration/deceleration. In still other embodiments, the speed sensor 112 and the acceleration sensor 114 can be provided as outputs from a global positioning system (GPS). The controller 56 can also be coupled with the transmission 32 and the accelerator pedal 34 to detect an operating gear of the transmission 32 and to detect a torque command signal from the accelerator pedal 34. The controller 56 can be coupled with a brake pedal 35, as illustrated in FIG. 4. In one embodiment, the controller 56 can detect operation of the brake pedal 35 according to a brake switch. In such an embodiment, the brake switch can be associated with the brake pedal 35 and selectively actuated by the brake pedal to operate brake lights on the vehicle 20.

Although the suspension system 36 is shown with respect to a left front wheel (e.g., 28), it will be appreciated that a suspension system can be provided in a similar arrangement for any of the wheels (e.g., 28, 30) of the vehicle 20. In certain embodiments, it will be appreciated that a wheel knuckle can comprise a non-steerable-type knuckle such as when the wheel knuckle is associated with one of the rear wheels 30.

One or more of the wheels (e.g., 28, 30) of the vehicle 20 can be associated with a brake system 106 that facilitates selective deceleration of the vehicle 20 such as through operation of the brake pedal 35 (FIG. 4), for example. In one embodiment, as illustrated in FIG. 2, in addition to the brake pedal 35, the brake system 106 can include a caliper 108 that is associated with a rotor 110 coupled with the front wheel 28. The caliper 108 can be associated with brake pads (not shown) and can be actuated through operation of the brake pedal 35 to facilitate selective deceleration of the front wheel 28. In another embodiment, the brake system 106 can include a drum that is coupled with a wheel and selectively contacted with brake shoes to stop rotation of the wheel. It will be appreciated that a brake (e.g., caliper-type or drum-type) can be similarly associated with any of the wheels (e.g., 28, 30) of the vehicle 20.

In one embodiment, when the vehicle 20 is braked, the controller 56 can facilitate operation of the lower control arm ball joint 48, the strut bearing 70, the steering rack guide 96, and the outer tie rod ball joint 100 from the nominal friction mode to the increased friction mode to facilitate attenuation of brake judder that could be imparted to the vehicle 20, as a result of the braking. For example, when the brake system 106 is actuated to decelerate the vehicle 20, a braking force can be applied to at least one of the vehicle's wheels (e.g., 28, 30), such as through operation of the caliper 108. When the braking force fluctuates, such as during severe braking or when the front rotors (e.g., 110) are imbalanced and/or warped, for example, brake judder can be imparted to the vehicle 20 from the brake system 106. Changing operation of the lower control arm ball joint 48, the strut bearing 70, the steering rack guide 96, and the outer tie rod ball joint 100 from the nominal friction mode to the increased friction mode can facilitate attenuation of the brake judder on the vehicle 20. For example, when the lower control arm ball joint 48, the strut bearing 70, the steering rack guide 96, and the outer tie rod ball joint 100 are operated in the increased friction mode, the friction force and/or friction torque of each of the lower control arm ball joint 48, the strut bearing 70, the steering rack guide 96, and the outer tie rod ball joint 100 can increase. By increasing the friction force and/or friction torque, the lower control arm ball joint 48, the strut bearing 70, the steering rack guide 96, and the outer tie rod ball joint 100 can operate more rigidly which can facilitate attenuation of brake judder that could otherwise be imparted to the vehicle 20 as a result of the braking action being undertaken by the brake system 106.

Operation of the lower control arm ball joint 48, the strut bearing 70, the steering rack guide 96, and the outer tie rod ball joint 100 in the increased friction mode, however, can in ways adversely affect the overall operation of the vehicle 20 such as by causing the suspension to feel overly stiff and/or unresponsive to an operator. It will be appreciated that the magnitude of the brake judder on the vehicle 20 can vary and that some lower magnitudes of brake judder may not be substantial enough to warrant attenuation. For example, for some lower magnitudes of brake judder, operation of the lower control arm ball joint 48, the strut bearing 70, the steering rack guide 96, and the outer tie rod ball joint 100 in the increased friction mode might adversely affect the overall operation of the vehicle 20 more than the brake judder otherwise would. The controller 56 can thus operate the lower control arm ball joint 48, the strut bearing 70, the steering rack guide 96, and the outer tie rod ball joint 100 in the increased friction mode once the magnitude of the brake judder is substantial enough to warrant attenuation.

It will be appreciated that the speed of the vehicle 20 and the deceleration rate of the vehicle 20 (e.g., the severity of the braking) can affect the magnitude of the brake judder upon the vehicle 20. The faster that the vehicle 20 is traveling or the greater the deceleration rate of the vehicle 20 during braking, the more severe the brake judder can be upon the vehicle 20. The speed and deceleration rate of the vehicle 20 can therefore affect whether the brake judder is substantial enough to warrant attenuation. For example, when the vehicle 20 brakes and is traveling faster than 60 kilometers per hour (K.P.H.). After one second of deceleration at a rate of 1.5 meters per second$^2$, the brake judder can be substantial enough to warrant attenuation.

In one embodiment, the controller 56 can thus facilitate operation of the lower control arm ball joint 48, the strut bearing 70, the steering rack guide 96, and the outer tie rod ball joint 100 in the increased friction mode when the speed of the vehicle 20 exceeds a threshold brake judder speed value and the deceleration rate of the vehicle 20 exceeds a threshold brake judder deceleration value for a time period T1. In such an embodiment, the controller 56 can facilitate operation of the lower control arm ball joint 48, the strut bearing 70, the steering rack guide 96, and the outer tie rod ball joint 100 in the nominal friction mode when the vehicle 20 is first braked. If the deceleration rate does not reach the threshold brake judder deceleration value for the time period T1 or if the vehicle speed does not exceed the threshold brake judder speed value, the lower control arm ball joint 48, the strut bearing 70, the steering rack guide 96, and the outer tie rod ball joint 100 can continue operating in the nominal friction mode. However, if the deceleration rate exceeds the threshold brake judder deceleration value for the time period T1 and the speed of the vehicle 20 exceeds the threshold brake judder speed value after the time period T1 has elapsed, the controller 56 can facilitate operation of the lower control arm ball joint 48, the strut bearing 70, the steering rack guide 96, and the outer tie rod ball joint 100 in the increased friction mode to attenuate brake judder that could otherwise be imparted to the vehicle 20.

Figure 7:
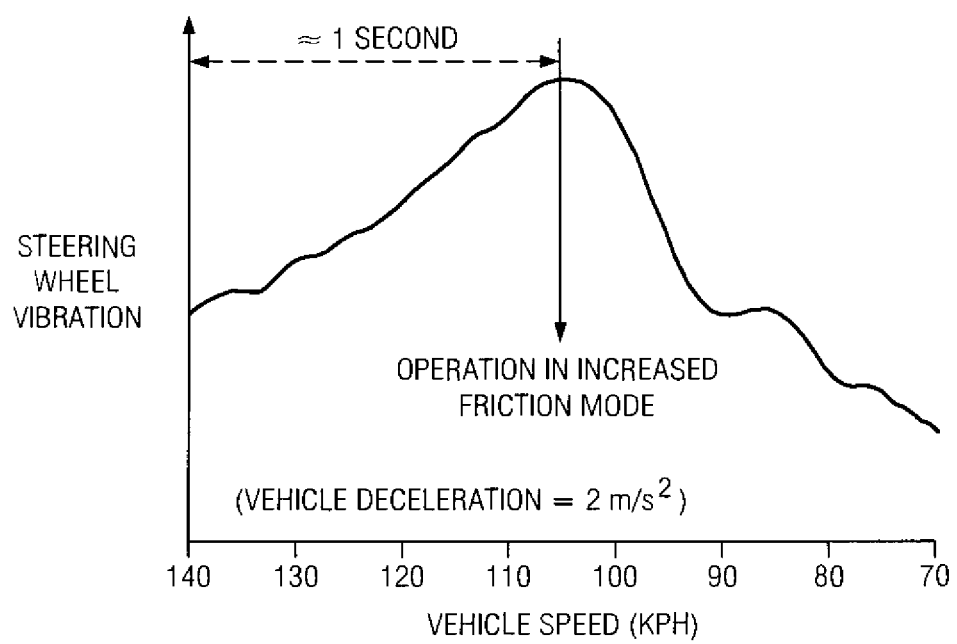
FIG. 7 is a plot depicting a relationship between steering wheel vibration and vehicle speed.

It will be appreciated that brake judder can cause the steering wheel 104 to vibrate. An example of a response of steering wheel vibration during brake judder is shown in FIG. 7. In this example, the controller 56 is set so that the threshold brake judder speed value is 60 K.P.H., the threshold brake judder deceleration value is 1.5 m/s$^2$, and the time period T1 is 1 second. In this example, the vehicle 20 is braked at a deceleration rate of 2 m/s$^2$ from a speed of 140 K.P.H. The lower control arm ball joint 48, the strut bearing 70, the steering rack guide 96, and the outer tie rod ball joint 100 are initially operated in the nominal friction mode such that the steering wheel vibration tends to increase as the vehicle 20 decelerates. Once the vehicle 20 has decelerated at about 2 m/s$^2$ for about 1 second and with the speed of the vehicle 20 in excess of 60 K.P.H. (e.g., at about 105 K.P.H.), the controller 56 can facilitate operation of the lower control arm ball joint 48, the strut bearing 70, the steering rack guide 96, and the outer tie rod ball joint 100 in the increased friction mode which can attenuate the steering wheel vibration as the vehicle 20 continues to decelerate.

In one embodiment, the controller 56 can return operation of the lower control arm ball joint 48, the strut bearing 70, the steering rack guide 96, and the outer tie rod ball joint 100 to the nominal friction mode from the increased friction mode once a second threshold time period has elapsed (e.g., 2 seconds). In another embodiment, the controller 56 can return operation of the lower control arm ball joint 48, the strut bearing 70, the steering rack guide 96, and the outer tie rod ball joint 100 to the nominal friction mode from the increased friction mode, once the speed of the vehicle 20 falls below the threshold speed value and/or the deceleration rate falls below the threshold deceleration value. In yet another embodiment, the controller 56 can return operation of the lower control arm ball joint 48, the strut bearing 70, the steering rack guide 96, and the outer tie rod ball joint 100 to the nominal friction mode from the increased friction mode once the vehicle 20 is no longer being braked (e.g., according to releasing of the brake pedal 35).

In some embodiments, the lower control arm ball joint 48, the strut bearing 70, the steering rack guide 96, and the outer tie rod ball joint 100 can be operated between the nominal friction mode and the increased friction mode to attenuate brake judder according to any of a variety of other suitable additional or alternative vehicular conditions. For example, the controller 56 can operate the lower control arm ball joint 48, the strut bearing 70, the steering rack guide 96, and the outer tie rod ball joint 100 between the nominal friction mode and the increased friction mode in response to operation of the brake system 106. Prior to braking, the lower control arm ball joint 48, the strut bearing 70, the steering rack guide 96, and the outer tie rod ball joint 100 can be operated in the nominal friction mode. Once the vehicle 20 begins braking, the controller 56 can facilitate operation of the lower control arm ball joint 48, the strut bearing 70, the steering rack guide 96, and the outer tie rod ball joint 100 in the increased friction mode until braking is completed.

Figure 8:
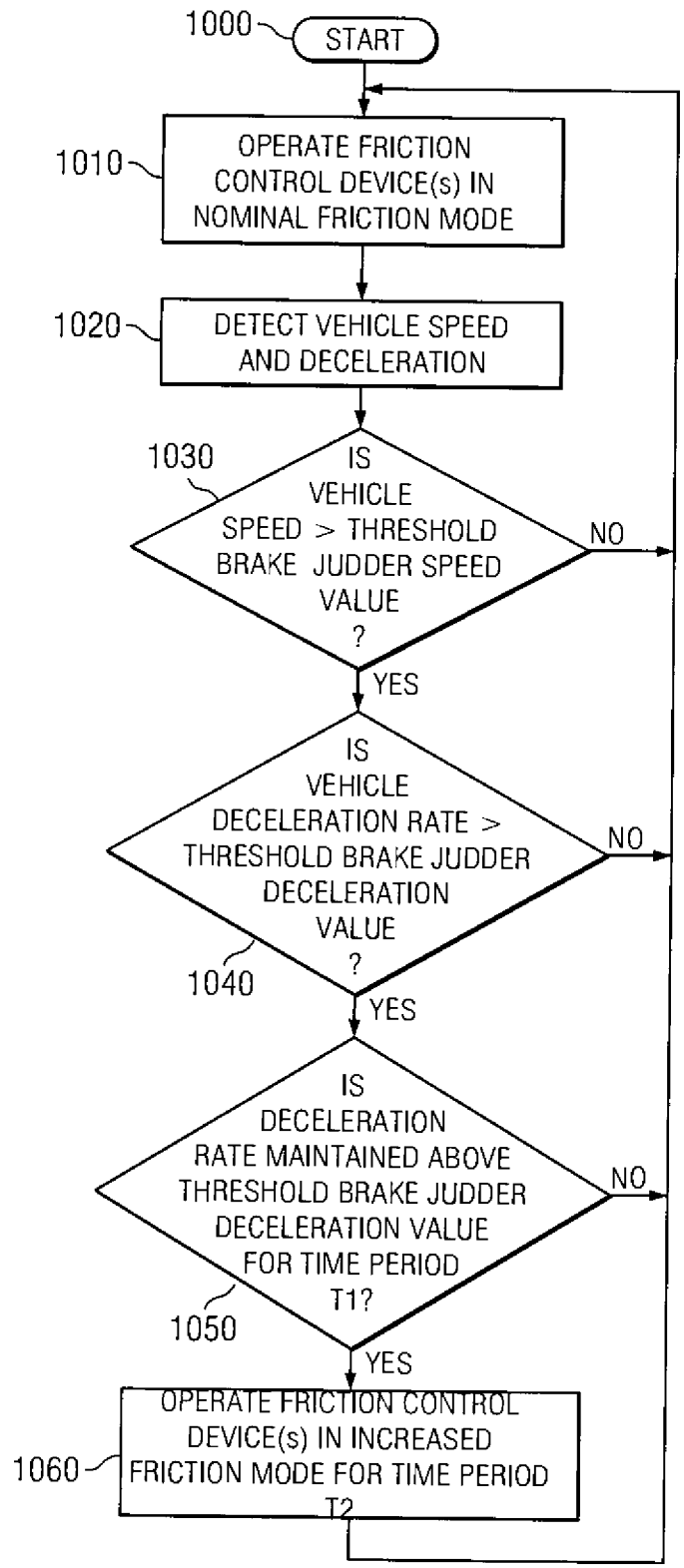
FIG. 8 is a flow chart depicting a control routine implemented by the controller of FIG. 4, according to one embodiment.

The controller 56 can be configured to operate any of a variety of suitable control routines. For example, one embodiment of a control routine implemented by the controller 56 is generally illustrated in FIG. 8. Upon startup (1000), the controller 56 can operate the lower control arm ball joint 48, the strut bearing 70, the steering rack guide 96, and the outer tie rod ball joint 100 in the nominal friction mode (1010). The controller 56 can detect the speed and deceleration rate of the vehicle 20 (1020). The controller 56 can determine whether the speed of the vehicle 20 is above the threshold brake judder speed value (1030). If the speed is below or equal to the threshold brake judder speed value, the lower control arm ball joint 48, the strut bearing 70, the steering rack guide 96, and the outer tie rod ball joint 100 can continue to operate in the nominal friction mode. If the speed is above the threshold brake judder speed value, the controller 56 can determine whether the deceleration rate of the vehicle 20 is above the threshold brake judder deceleration value (1040). If the deceleration rate is below or equal to the threshold brake judder deceleration value, the lower control arm ball joint 48, the strut bearing 70, the steering rack guide 96, and the outer tie rod ball joint 100 can continue to operate in the nominal friction mode. Once the deceleration rate is maintained above the threshold brake judder deceleration value for a time period T1 (1050), the controller 56 can facilitate operation of the lower control arm ball joint 48, the strut bearing 70, the steering rack guide 96, and the outer tie rod ball joint 100 in the increased friction mode. The controller 56 can maintain operation of the lower control arm ball joint 48, the strut bearing 70, the steering rack guide 96, and the outer tie rod ball joint 100 in the increased friction mode for a time period T2 (e.g., 2 seconds) before returning operation of the lower control arm ball joint 48, the strut bearing 70, the steering rack guide 96, and the outer tie rod ball joint 100 to the nominal friction mode. It will be appreciated that the controller 56 can perform the steps of determining whether the speed and deceleration rate of the vehicle 20 is above a threshold speed value and the threshold deceleration value (1030, 1040) in any sequence, such as alternatively or parallel with one another, for example.

It will be appreciated that, when the vehicle 20 is accelerated, the front wheels 28 can undergo torque steer which can cause the vehicle 20 to diverge unexpectedly from the intended path. In one embodiment, the controller 56 can facilitate operation of the lower control arm ball joint 48, the strut bearing 70, the steering rack guide 96, and the outer tie rod ball joint 100 in the increased friction mode to reduce torque steer of the front wheels 28 during such acceleration. It will be appreciated that operation of the lower control arm ball joint 48, the strut bearing 70, the steering rack guide 96, and the outer tie rod ball joint 100 in the increased friction mode can facilitate effective reduction of torque steer in a similar manner as described above for brake judder (e.g., more rigid operation of the lower control arm ball joint 48, the strut bearing 70, the steering rack guide 96, and the outer tie rod ball joint 100). It will be appreciated that, during operation of the vehicle 20, the magnitude of the torque steer can vary and that some lower magnitudes of torque steer may not be substantial enough to warrant attenuation. The controller 56 can accordingly operate the lower control arm ball joint 48, the strut bearing 70, the steering rack guide 96, and the outer tie rod ball joint 100 in the increased friction mode once the magnitude of the torque steer is substantial enough to warrant reduction. It will be appreciated that the speed, acceleration pedal velocity, and transmission gear can affect the magnitude of the torque steer upon the vehicle 20 and can accordingly affect whether the torque steer is substantial enough to warrant reduction. For example, when the vehicle 20 is traveling slower than 15 K.P.H, the transmission is operating in a first gear, in a second gear, or is in process of shifting between gears, and the accelerator pedal is being depressed at a velocity of greater than 2000 percent per second, the torque steer of the vehicle 20 can be substantial enough to warrant attenuation.

In one embodiment, the controller 56 can thus facilitate a change in operation of the lower control arm ball joint 48, the strut bearing 70, the steering rack guide 96, and the outer tie rod ball joint 100 from the nominal friction mode to the increased friction mode when the speed of the vehicle 20 is below a threshold torque steer speed value, the transmission 32 is in one of a first or second gear or is shifting between gears, and the velocity of the accelerator pedal 34 exceeds a threshold pedal velocity value. In such an embodiment, the controller 56 can facilitate operation of the lower control arm ball joint 48, the strut bearing 70, the steering rack guide 96, and the outer tie rod ball joint 100 in the nominal friction mode when the vehicle 20 begins accelerating. If the speed of the vehicle 20 is above the threshold torque steer speed value, the transmission 32 is not in the first or second gear and is not shifting between gears, and/or the velocity of the accelerator pedal 34 does not exceed the threshold pedal velocity value, the lower control arm ball joint 48, the strut bearing 70, the steering rack guide 96, and the outer tie rod ball joint 100 can continue operating in the nominal friction mode. However, once the speed of the vehicle 20 is below the threshold torque steer speed value, with the transmission 32 is in the first or second gear or is shifting, and the velocity of the accelerator pedal 34 exceeds the threshold pedal velocity value, the controller 56 can facilitate operation of the lower control arm ball joint 48, the strut bearing 70, the steering rack guide 96, and the outer tie rod ball joint 100 in the increased friction mode to reduce torque steer that could otherwise adversely affect operation of the vehicle 20.

After a time period T3 has elapsed (e.g., 2 seconds), the controller 56 can return operation of the lower control arm ball joint 48, the strut bearing 70, the steering rack guide 96, and the outer tie rod ball joint 100 to the nominal friction mode. In another embodiment, the controller 56 can return operation of the lower control arm ball joint 48, the strut bearing 70, the steering rack guide 96, and the outer tie rod ball joint 100 to the nominal friction mode, once the speed of the vehicle 20 exceeds the threshold torque steer speed value, the transmission 32 is no longer in the first or second gear, or the velocity of the accelerator pedal 34 no longer exceeds the threshold pedal velocity value. In another embodiment, since torque steer might not affect operation of the vehicle 20 significantly during braking, the controller 56 can operate the lower control arm ball joint 48, the strut bearing 70, the steering rack guide 96, and the outer tie rod ball joint 100 in the low friction mode during any instance of vehicular braking.

Figure 9:
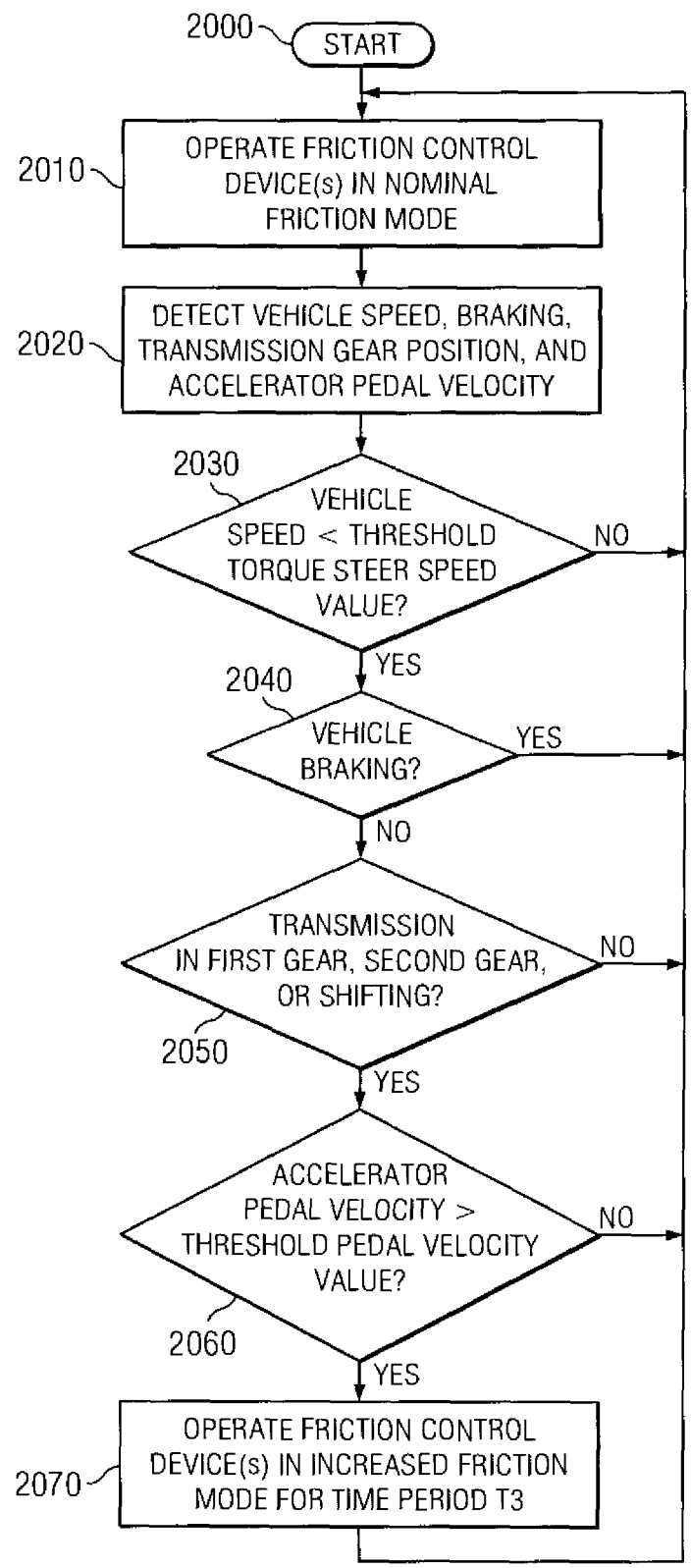
FIG. 9 is a flow chart depicting a control routine implemented by the controller of FIG. 4, according to another embodiment.

One embodiment of a control routine implemented by the controller 56 is generally illustrated in FIG. 9. Upon startup (2000), the controller 56 can operate the lower control arm ball joint 48, the strut bearing 70, the steering rack guide 96, and the outer tie rod ball joint 100 in a nominal friction mode (2010). The controller 56 can detect the speed, operation of the brake system 106, transmission gear position, and accelerator pedal velocity (2020). The controller 56 can determine whether the speed of the vehicle 20 is below a threshold torque steer speed value (2030). If the speed is above or equal to the threshold speed value, the lower control arm ball joint 48, the strut bearing 70, the steering rack guide 96, and the outer tie rod ball joint 100 can continue to operate in the nominal friction mode. If the speed is below the threshold torque steer speed value, the controller 56 can determine whether the vehicle 20 is braking (2040). If the vehicle 20 is braking, the lower control arm ball joint 48, the strut bearing 70, the steering rack guide 96, and the outer tie rod ball joint 100 can continue to operate in the nominal friction mode. If the vehicle 20 is not braking, the controller 56 can determine whether the transmission 32 is in a first gear, a second gear, or is shifting between gears (2050). If the transmission 32 is neither in a first gear nor a second gear and is not shifting between gears, the lower control arm ball joint 48, the strut bearing 70, the steering rack guide 96, and the outer tie rod ball joint 100 can continue to operate in the nominal friction mode. If the transmission 32 is in a first gear, in a second gear, or is shifting between gears, the controller 56 can determine whether the accelerator pedal 34 is being depressed at a velocity that exceeds a threshold pedal velocity value (2060). If the velocity of the accelerator pedal 34 does not exceed or is equal to the threshold velocity value, the lower control arm ball joint 48, the strut bearing 70, the steering rack guide 96, and the outer tie rod ball joint 100 can continue to operate in the nominal friction mode. If the velocity of the accelerator pedal 34 exceeds the threshold pedal velocity value, the controller 56 can facilitate operation of the lower control arm ball joint 48, the strut bearing 70, the steering rack guide 96, and the outer tie rod ball joint 100 in the increased friction mode (2070). The controller 56 can maintain operation of the lower control arm ball joint 48, the strut bearing 70, the steering rack guide 96, and the outer tie rod ball joint 100 in the increased friction mode for a time period T3 (e.g., 2 seconds) before returning operation of the lower control arm ball joint 48, the strut bearing 70, the steering rack guide 96, and the outer tie rod ball joint 100 to the nominal friction mode. It will be appreciated that the controller 56 can perform certain steps of the control routine (e.g., steps 2030, 2040, 2050) in any sequence, such as alternatively or parallel with one another, for example.

In some embodiments, the controller 56 can facilitate a change in operation of the lower control arm ball joint 48, the strut bearing 70, the steering rack guide 96, and the outer tie rod ball joint 100 between the nominal friction mode and the increased friction mode to reduce torque steer according to any of a variety of other suitable additional or alternative vehicular conditions. For example, the controller 56 can change operation of the lower control arm ball joint 48, the strut bearing 70, the steering rack guide 96, and the outer tie rod ball joint 100 between the nominal friction mode and the increased friction mode in response to acceleration of the vehicle 20 in excess of a threshold torque steer acceleration value.

It will be appreciated that, the vehicle 20 can be susceptible to vertical motion, such as when the vehicle 20 travels over a crest of a hill, for example. The vertical motion can affect the overall performance of the vehicle 20 such as by reducing contact of the wheels 28, 30 with a roadway, for example. In one embodiment, the controller 56 can facilitate a change in operation of the lower control arm ball joint 48, the strut bearing 70, the steering rack guide 96, and the outer tie rod ball joint 100 from the nominal friction mode to the increased friction mode to reduce vertical motion during operation. It will be appreciated that operation of the lower control arm ball joint 48, the strut bearing 70, the steering rack guide 96, and the outer tie rod ball joint 100 in the increased friction mode can facilitate effective reduction of vertical motion in a similar manner as described above for brake judder (e.g., more rigid operation of the lower control arm ball joint 48, the strut bearing 70, the steering rack guide 96, and the outer tie rod ball joint 100). In such an embodiment, the controller 56 can facilitate operation of the lower control arm ball joint 48, the strut bearing 70, the steering rack guide 96, and the outer tie rod ball joint 100 in the nominal friction mode when it is not appropriate to reduce vertical motion on the vehicle 20 (e.g., when the vehicle 20 is not experiencing vertical acceleration).

It will be appreciated that, the magnitude of the vertical motion can vary and that some lower magnitudes of vertical motion may not be substantial enough to warrant attenuation. The controller 56 can accordingly operate the lower control arm ball joint 48, the strut bearing 70, the steering rack guide 96, and the outer tie rod ball joint 100 in the increased friction mode once the magnitude of the vertical motion is substantial enough to warrant reduction. Speed and vertical acceleration of the vehicle 20 can affect whether the magnitude of vertical motion is substantial enough to warrant reduction. For example, when the vehicle 20 is traveling above 15 K.P.H. and undergoes a 2 m/s² vertical acceleration during operation, the vertical motion of the vehicle 20 can be substantial enough to warrant attenuation.

In one embodiment, the controller 56 can thus facilitate a change in operation of the lower control arm ball joint 48, the strut bearing 70, the steering rack guide 96, and the outer tie rod ball joint 100 from the nominal friction mode to the increased friction mode when the speed of the vehicle 20 is above a threshold vehicular speed value and the vertical acceleration exceeds a threshold vertical acceleration value. For clarity, it is noted that the threshold vehicular speed value refers to a threshold value of the speed of the vehicle 20 when the vehicle 20 undergoes vertical motion. In such an embodiment, the controller 56 can initiate operation of the lower control arm ball joint 48, the strut bearing 70, the steering rack guide 96, and the outer tie rod ball joint 100 in the nominal friction mode. If the speed of the vehicle 20 remains below the threshold vehicular speed value and/or the vertical acceleration remains below the threshold vertical acceleration value, the lower control arm ball joint 48, the strut bearing 70, the steering rack guide 96, and the outer tie rod ball joint 100 can continue operating in the nominal friction mode. However, once the speed of the vehicle 20 exceeds the threshold vehicular speed value and the vertical acceleration exceeds the threshold vertical acceleration value, the controller 56 can facilitate operation of the lower control arm ball joint 48, the strut bearing 70, the steering rack guide 96, and the outer tie rod ball joint 100 in the increased friction mode to reduce vertical motion of the vehicle 20. In another embodiment, to reduce vertical motion, the controller 56 can facilitate operation of the lower control arm ball joint 48, the strut bearing 70, the steering rack guide 96, and the outer tie rod ball joint 100 in the increased friction mode when the vertical acceleration of the vehicle 20 is above the threshold vertical acceleration value, irrespective of the speed of the vehicle 20.

After a second threshold time period has elapsed (e.g., 2 seconds), the controller 56 can return operation of the lower control arm ball joint 48, the strut bearing 70, the steering rack guide 96, and the outer tie rod ball joint 100 to the nominal friction mode. In another embodiment, the controller 56 can return operation of the lower control arm ball joint 48, the strut bearing 70, the steering rack guide 96, and the outer tie rod ball joint 100 to the nominal friction mode once the speed of the vehicle 20 decreases below the threshold vehicular speed value and/or the vertical acceleration decreases below the threshold vertical acceleration value.

It will be appreciated that, the speed of the vehicle 20 can affect a variety of vehicular operating conditions. For example, as the speed of the vehicle 20 increases, operation of the steering wheel 104 can become less difficult and can have a greater affect on the path of the vehicle 20 (e.g., steering feel). The vehicle 20 can also be more susceptible to body roll (e.g., during turning) and drifting (e.g., due to due to canted road profile, wind, or asymmetry of the chassis). The controller 56 can thus facilitate operation of the lower control arm ball joint 48, the strut bearing 70, the steering rack guide 96, and the outer tie rod ball joint 100 according to the speed of the vehicle 20 to improve the response of the vehicle 20 to steering, body roll, and/or drifting.

In one embodiment, the controller 56 can facilitate a change in operation of the lower control arm ball joint 48, the strut bearing 70, the steering rack guide 96, and the outer tie rod ball joint 100 from the nominal friction mode to the increased friction mode once the speed of the vehicle 20 exceeds a threshold speed (e.g., about 40 K.P.H.). In another embodiment, the controller 56 can facilitate a change in operation of the lower control arm ball joint 48, the strut bearing 70, the steering rack guide 96, and the outer tie rod ball joint 100 between the nominal friction mode and a plurality of differing increased friction modes according to the speed of the vehicle 20. For example, when the speed of the vehicle 20 is below about 10 K.P.H. or is between about 10-30 K.P.H. (e.g., operation at low speed), the lower control arm ball joint 48, the strut bearing 70, the steering rack guide 96, and the outer tie rod ball joint 100 can operate in the nominal friction mode and a first friction mode, respectively. When the speed of the vehicle 20 is between about 30-50 K.P.H., between about 50-70 K.P.H., or is above about 70 K.P.H., the lower control arm ball joint 48, the strut bearing 70, the steering rack guide 96, and the outer tie rod ball joint 100 can operate in a second, third, and fourth friction mode, respectively. Changing operation among the nominal friction mode and the first, second, third, and fourth friction modes, respectively, can increase the friction force and/or friction torque of one or more of the lower control arm ball joint 48, the strut bearing 70, the steering rack guide 96, and the outer tie rod ball joint 100 in order to affect the response of the vehicle 20 to steering, body roll, and/or drifting in a desirable manner.

It will be appreciated that the controller 56 can additionally or alternatively facilitate a change in operation of the lower control arm ball joint 48, the strut bearing 70, the steering rack guide 96, and the outer tie rod ball joint 100 between a nominal friction mode and a plurality of differing increased friction modes to accommodate brake judder attenuation, torque steer reduction, drift reduction, body roll motion reduction, vertical motion reduction, steering feel improvement at low speed, and/or steering feel improvement at high speed. While a plurality of friction control devices can be simultaneously adjusted between a nominal friction mode and an increased friction mode, as described above, it will be appreciated that, alternatively, different friction control devices of a common system can be operated at different times and/or in different ways to achieve a desired performance characteristic.

Figure 10:
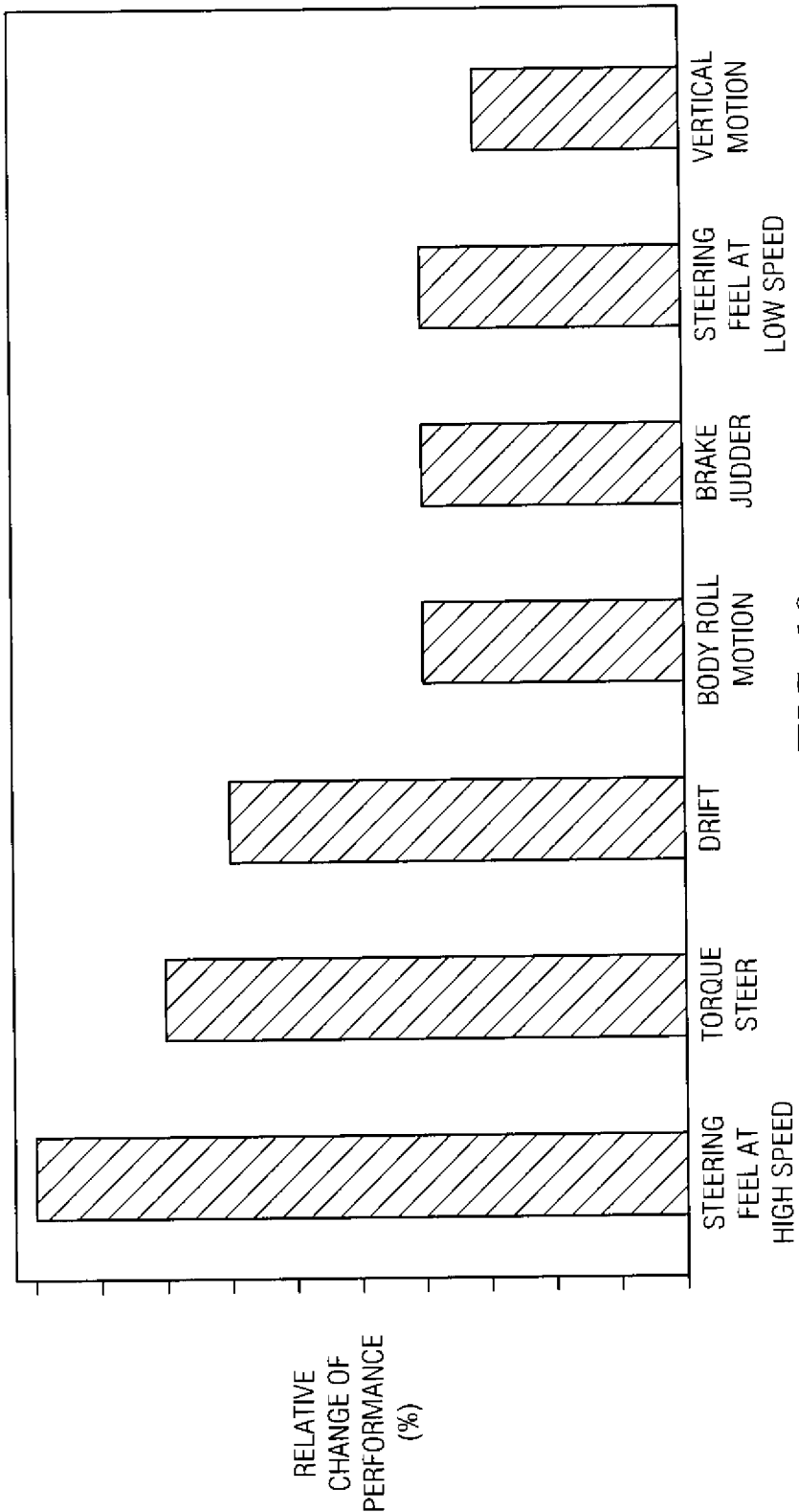
FIG. 10 is a bar-type plot depicting how certain vehicle performance areas can change when an overall chassis friction is changed by 50%.

In one embodiment, changing each of the suspension damper 42, the lower control arm ball joint 48, the strut bearing 70, the steering rack guide 96, and the outer tie rod ball joint 100 from the nominal friction mode to the increased friction mode can change the overall chassis friction of the vehicle 20. FIG. 10 illustrates how a 50% increase in overall chassis friction can affect brake judder, torque steer, drift, body roll motion, vertical motion, steering feel at low speed, and steering feel at high speed (e.g., vehicular performance areas). It will be appreciated however, that in other embodiments, the suspension damper 42, the lower control arm ball joint 48, the strut bearing 70, the steering rack guide 96, and the outer tie rod ball joint 100 might not be operated together but instead operated between the nominal friction mode and the increased friction mode at different times and/or at different frictions (e.g., friction forces and/or friction torques). For example, the friction forces and/or friction torques for each of the suspension damper 42, the lower control arm ball joint 48, the strut bearing 70, the steering rack guide 96, and the outer tie rod ball joint 100 can be selected according to a predefined table and in real-time in order to achieve appropriate brake judder attenuation, torque steer reduction, drift reduction, body roll motion reduction, vertical motion reduction, steering feel improvement at low speed, and/or steering feel improvement at high speed. In still other embodiments, at least one of the suspension damper 42, the lower control arm ball joint 48, the strut bearing 70, the steering rack guide 96, and the outer tie rod ball joint 100 can be deactivated (e.g., maintained in the nominal friction mode) during brake judder attenuation, torque steer reduction, drift reduction, body roll motion reduction, vertical motion reduction, steering feel improvement at low speed, and steering feel improvement at high speed.

Although operation of each of the lower control arm ball joint 48, the strut bearing 70, the steering rack guide 96, and the outer tie rod ball joint 100 is described above, it will be appreciated that any friction control device or combination thereof can be selected for operation by the controller 56 to facilitate brake judder attenuation, torque steer reduction, drift reduction, body roll motion reduction, vertical motion reduction, steering feel improvement at low speed, and steering feel improvement at high speed. In one embodiment, the lower control arm ball joint 48 and the outer tie rod ball joint 100 can be configured as friction control devices and the suspension damper 42, the strut bearing 70, and the steering rack guide 96 can be provided in respective conventional arrangements (e.g., as non-friction control devices). With the suspension damper 42, the strut bearing 70, and the steering rack guide 96 in a conventional arrangement, the weight and cost oftentimes associated with a friction control device (e.g., weight and cost of routing of communication cables from the friction control device to the controller 56) can be avoided. Selection of the lower control arm ball joint 48 and the outer tie rod ball joint 100 as friction control devices can be based at least in part upon testing of each of the suspension damper 42, the lower control arm ball joint 48, the strut bearing 70, the steering rack guide 96, and the outer tie rod ball joint 100.

In one embodiment, the operation of each of the suspension damper 42, the lower control arm ball joint 48, the strut bearing 70, the steering rack guide 96, and the outer tie rod ball joint 100 can be tested (e.g., through on-road testing and/or simulated testing) to determine how varying the friction torque and/or friction force of each of the suspension damper 42, the lower control arm ball joint 48, the strut bearing 70, the steering rack guide 96, and the outer tie rod ball joint 100 can influence the vehicular performance areas. As illustrated in FIG. 11, each friction torque and/or friction force of the suspension damper 42, the lower control arm ball joint 48, the strut bearing 70, the steering rack guide 96, and the outer tie rod ball joint 100 can be assigned one of four influence ratings for each performance area: not influential, partially influential, influential, or most influential.

The results of the testing shown in FIG. 11 can be utilized to determine which of the suspension damper 42, the lower control arm ball joint 48, the strut bearing 70, the steering rack guide 96, and the outer tie rod ball joint 100 to implement as a friction control device, as opposed to a non-friction control device, and then how to operate these devices during operation of the vehicle 20. In one embodiment, since the friction torque of the lower control arm ball joint 48 and the friction torque of the outer tie rod ball joint 100 has primarily "most influential" and "influential" ratings (e.g., denoted by a bullseye and a circle, respectively) and only one "not influential" rating, (e.g., denoted by an "X"), the lower control arm ball joint 48 and the outer tie rod ball joint 100 can be implemented on a vehicle as friction control devices and the suspension damper 42, the strut bearing 70, and the steering rack guide 96 can be implemented as non-friction control devices. However, depending upon results of testing and desired performance characteristics of a vehicle, it will be appreciated that, any of the suspension damper 42, the lower control arm ball joint 48, the strut bearing 70, the steering rack guide 96, and/or the outer tie rod ball joint 100 can be selected as a friction control device.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A method for controlling a vehicle, the method comprising:
    operating at least one friction control device in a first friction mode, said at least one friction control device comprising one of a suspension damper, a lower control arm ball joint, a strut bearing, a steering rack guide, and an outer tie rod ball joint;
    detecting a vehicular speed;
    detecting a vehicular deceleration rate; and
    changing operation of said at least one friction control device from the first friction mode to a second friction mode in response to both the vehicular speed exceeding a threshold brake judder speed value and the vehicular deceleration rate exceeding a threshold brake judder deceleration value.

2. The method of claim 1 further comprising changing operation of said at least one friction control device from the second friction mode to the first friction mode when, during operation of said at least one friction control device in the second friction mode and after a predetermined time period, any one of the following occurs:
    the vehicular speed decreases below the threshold brake judder speed value; and
    the vehicular deceleration rate decreases below the threshold brake judder deceleration value.

3. The method of claim 2 wherein said at least one friction control device comprises a plurality of friction control devices and four of the friction control devices comprise the lower control arm ball joint, the strut bearing, the steering rack guide, and the outer tie rod ball joint.

4. The method of claim 2 wherein said at least one friction control device comprises a plurality of friction control devices and two of the friction control devices comprises the lower control arm ball joint and the outer tie rod ball joint.

5. The method of claim 1 further comprising changing operation of said at least one friction control device from the second friction mode to the first friction mode once said at least one friction control device has operated in the second friction mode for a predetermined time period.

6. The method of claim 5 wherein the threshold brake judder speed value comprises 60 K.P.H., the threshold brake judder deceleration value comprises 1.5 m/s$^2$, and the predetermined time period comprises 2 seconds.

7. The method of claim 1 wherein changing operation of said at least one friction control device from the first friction mode to the second friction mode comprises varying one of a friction force and a friction torque of said at least one friction control device proportionally with at least one of the vehicular speed and the vehicular deceleration rate.

8. The method of claim 1 wherein the first friction mode comprises a nominal friction mode and the second friction mode comprises an increased friction mode.

9. The method of claim 1 wherein said at least one friction control device comprises a plurality of friction control devices and at least two friction control devices of the plurality of friction control devices are differing ones of a suspension damper, a lower control arm ball joint, a strut bearing, a steering rack guide, and an outer tie rod ball joint.

* * * * *